United States Patent
Mulvey

(10) Patent No.: US 7,257,622 B2
(45) Date of Patent: *Aug. 14, 2007

(54) FILE PROPAGATION TOOL

(75) Inventor: Bret J. P. Mulvey, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 212 days.

This patent is subject to a terminal disclaimer.

(21) Appl. No.: 11/201,130

(22) Filed: Aug. 11, 2005

(65) Prior Publication Data

US 2005/0278343 A1    Dec. 15, 2005

Related U.S. Application Data

(63) Continuation of application No. 09/568,174, filed on May 9, 2000, now Pat. No. 6,968,363.

(51) Int. Cl.
*G06F 15/16* (2006.01)
(52) U.S. Cl. .................. 709/217; 717/124; 715/500; 707/10
(58) Field of Classification Search ............... 709/217; 717/124; 715/500; 707/10
See application file for complete search history.

(56) References Cited

U.S. PATENT DOCUMENTS

| 4,853,878 | A  | 8/1989  | Brown         |
|-----------|----|---------|---------------|
| 5,933,851 | A  | 8/1999  | Kojima et al. |
| 6,493,733 | B1 | 12/2002 | Pollack et al.|
| 6,546,387 | B1 | 4/2003  | Triggs        |
| 6,560,639 | B1 | 5/2003  | Dan et al.    |
| 6,581,061 | B2 | 6/2003  | Graham        |
| 6,584,507 | B1 | 6/2003  | Bradley et al.|

OTHER PUBLICATIONS

Mike Moore, "Publishing to the Web in a Distributed Corporate Environment", Microsoft, Jul. 1, 1999.
Bruno et al., "Building a Better Product Catalog", Jun. 1, 1999.
"Putting Your HTML onto the Production Server", UCLA, Apr. 24, 1999.

*Primary Examiner*—Jungwon Chang
(74) *Attorney, Agent, or Firm*—Banner & Witcoff, Ltd.

(57) ABSTRACT

A method for controlling the flow of files from a development server to another server using a file propagation tool is disclosed. A job comprising at least one file on a development server is created, wherein the at least one file is selected using the file propagation tool loaded on a computer. The job is then copied to the computer. The job is copied to a test server for testing. The job is copied to a live server once the job has been successfully tested.

9 Claims, 8 Drawing Sheets

FILE PROPAGATION TOOL

CROSS REFERENCE TO RELATED APPLICATIONS

This application is a continuation of application Ser. No. 09/568,174, filed May 9, 2000, now U.S. Pat. No. 6,968,363, of the same title, herein incorporated by reference.

BACKGROUND

When creating a website, a plurality of steps need to be taken in order to create the website. A website may be created from, for example, twenty to thirty thousand files. The files may need to be tested before the website is put on a live server. One method of creating and testing a website is to use the drag and drop method wherein files are dragged from one place on a computer screen to another causing the file to be tested or sent to the live server. However, the problem with the drag and drop system is that it is fraught with problems and can cause many errors. For example, the wrong file can be picked up or the file can be dropped in the wrong place. Furthermore, if a plurality of files needs to be tested together, all of the files may not be picked up. Thus, there is a need for a tool which addresses the two primary problems with website creation, namely, timeliness and quality control.

SUMMARY

A propagation tool is disclosed which automates the process of copying files from the web project to the test and staging servers. The propagation tool ensures that the files are copied to the correct location and enforces security on a folder-by-folder basis so that users cannot accidentally prop outside their areas of responsibility. It also allows users to check the prop status of files and to review the prop history of each file. By allowing the user to minimize the time it takes to publish content to a live website, it lets the user respond rapidly to market conditions and events such as those that occur when a security hole is found in a product or when competitors or the press publish inaccurate information about the user.

A method for controlling the flow of files from a development server to another server using a file propagation tool is disclosed. A job comprising at least one file on a development server is created, wherein the at least one file is selected using the file propagation tool loaded on a computer. The job is then copied to the computer. The job is copied to a test server for testing. The job is copied to a live server once the job has been successfully tested.

BRIEF DESCRIPTION OF THE DRAWINGS

The invention will now be described in detail with reference to the following figures, wherein.

DETAILED DESCRIPTION

Figure 1:
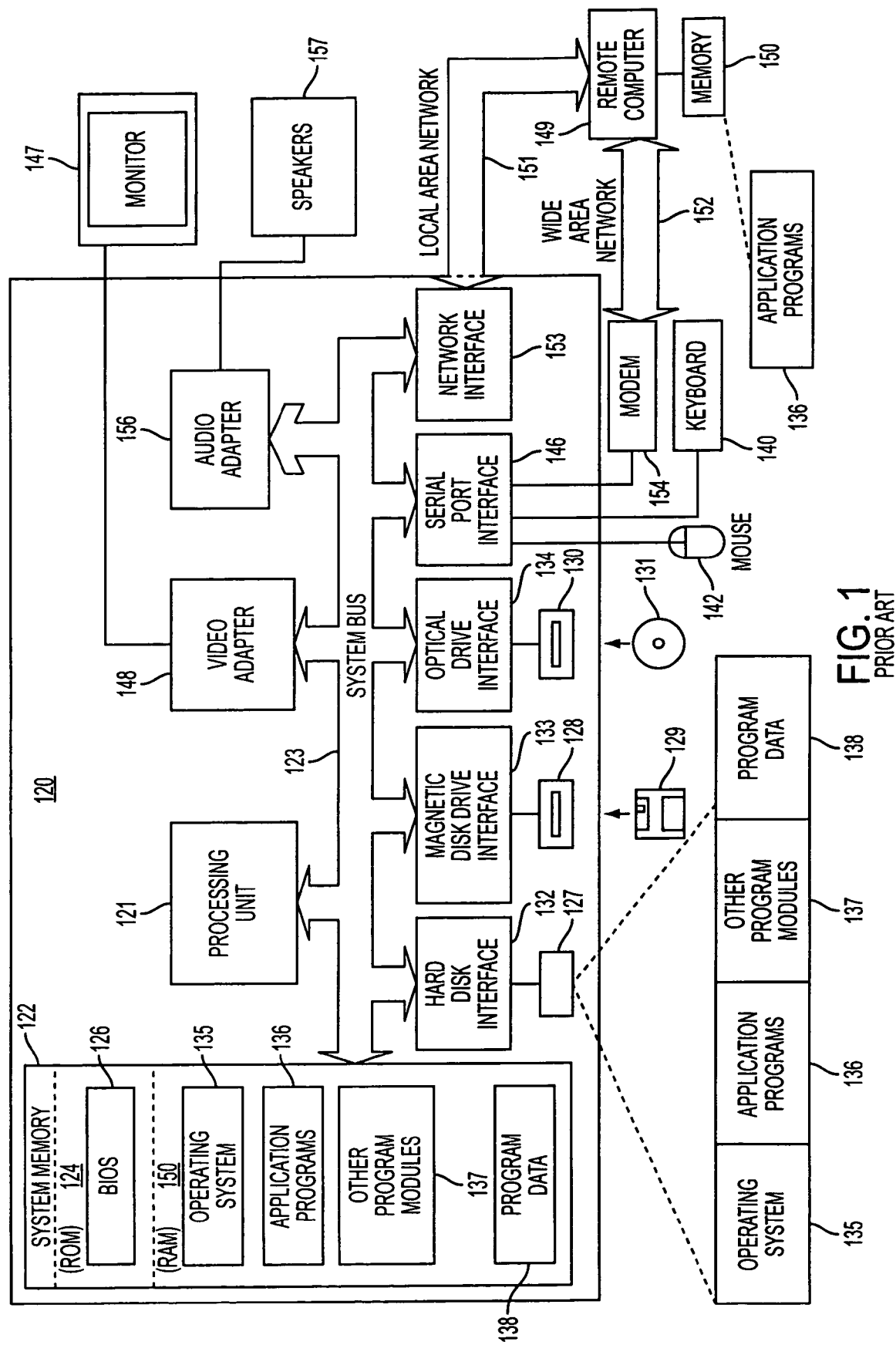
FIG. 1 illustrates a typical computer environment.

With reference to FIG. 1, an exemplary system for implementing the invention includes a general purpose computing device in the form of a conventional personal computer 120, including a processing unit/processor 121, a system memory 122, and a system bus 123 that couples various system components including the system memory to the processing unit/processor 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system 126 (BIOS), containing the basic routines that helps to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124, or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite dish, scanner or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. In addition to the monitor, personal computers typically include other peripheral output devices (not shown) such as speakers and printers.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide are network 152, such as the Internet. The modem 154, which may be internal or external, is connected to the system bus 123 via the serial port interface 146. In a networked environment program modules depicted relative to the personal computer 120, or portions thereof, may be stored in the remote memory storage device. It will be appreciated that the network connections shown are exemplary and other means of establishing communications between the computers may be used.

Figure 2:
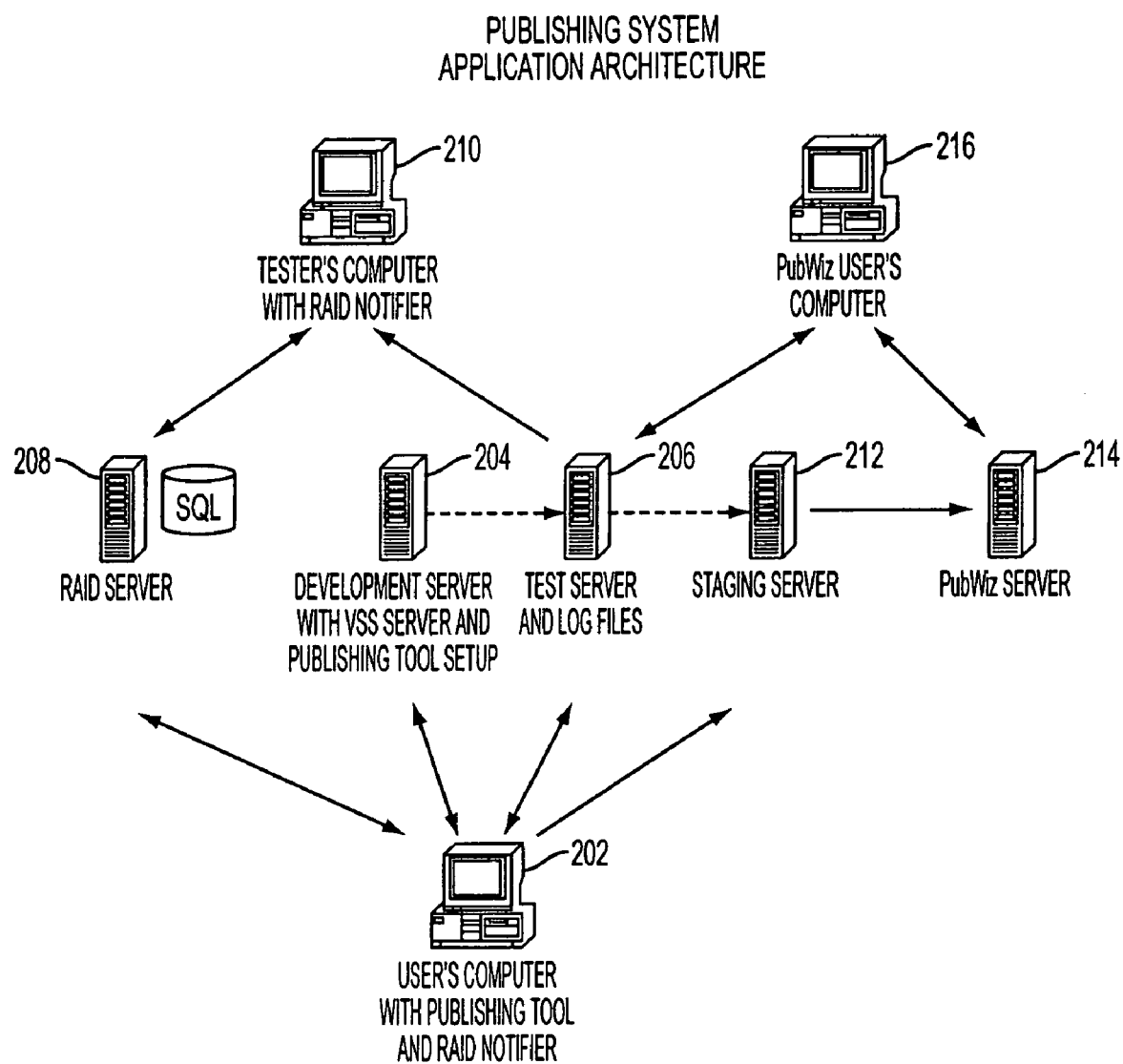
FIG. 2 illustrates a publishing system application architecture according to embodiments in the present invention.

FIG. 2 illustrates publishing system application architecture according to one embodiment of the present invention. The publishing system application architecture 200 comprises a user's computer 202, which is connected, for example, to a plurality of servers, for example, a development server 204, a test server 206, a staging server 212, and a bug-tracking server 208. The test server 206 and the bug-tracking server 208 are connected to a tester's computer as well. The staging server is connected to a publication server 214, which contains the live website. The publication user's computer 216 can also be connected to test server 206 and the publication server 214. It would be understood to one skilled in the art that multiple test servers could be used and connected to different staging servers. Alternatively, the development server 204 can also be connected to the test server 206 so that after files have been successfully tested, the files can be sent to the development server. The propagation tool of the present invention is loaded onto at least the user's computer.

The propagation tool is an application written as an ActiveX document object. By being a document object, the application can be accessed over an Internet as if it were a website. To start the tool, the user goes to a URL, such as, for example, 'http://' followed by 'pbsweb2/publish'. As long as the user's computer meets the minimum system requirements, the tool will automatically install on the user's computer. Once the tool has been installed, the tool then reads a configuration file. This is an XML file that specifies the location of the website being published, the database, for example, a "Visual SafeSource database" (VSS) where the content is stored, the locations of the staging test servers, etc. Embodiments of the invention will-be described using a Visual SafeSource database, but it will be understood that other types of databases can also be used and the invention is not limited to VSS databases.

Figure 3:
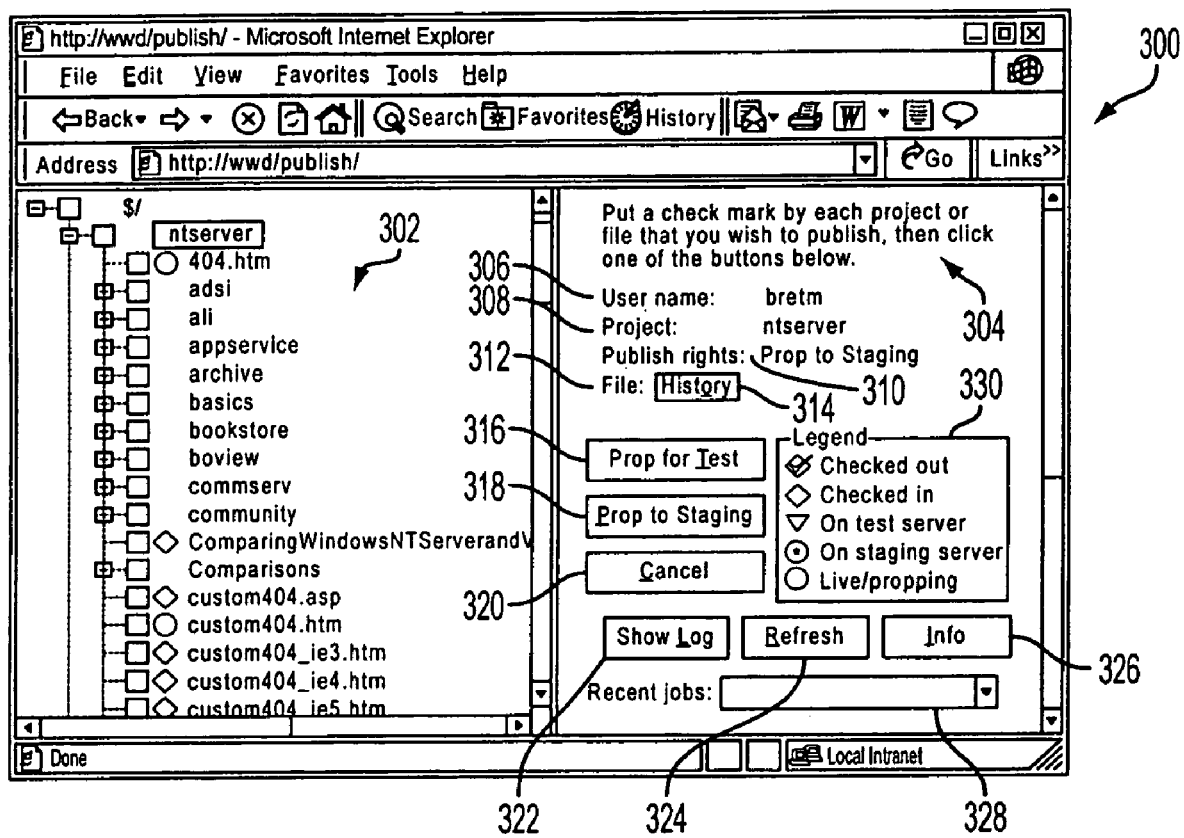
FIG. 3 illustrates a screen shot of a main screen of the file propagation tool according to embodiments of the present invention.

When the propagation tool opens the database specified in the configuration file, the tool displays the contents of the database in a "tree" view, which operates essentially the same as an expandable/collapsible list of folders, as illustrated in FIG. 3. In a first section 302 of the window 300, the tree view of the folders and files in the database are displayed.

The tool may indicate the current publishing status of each file in a variety of ways. For example, each file name can be denoted in one of a plurality of colors, wherein each color represents a different publishing status. For example, as illustrated in FIG. 3, a Legend 330 is provided on the right side 304 of the window 300 so as to remind the user of what each color means. For example, the color red can be used for the publishing status of being edited, the color yellow can be used to illustrate that the file is in the review and testing stage, the color blue can be used to illustrate that the file is in the live and propping stage, light green can be used to illustrate that the file is a folder, and finally, dark green can be used to illustrate that the file is in the please wait state. Alternatively, the tool can indicate the current publishing status of each file by using a color-coded icon next to each file name. For example, a red diamond may indicate that the file has been checked in. A pink diamond with a check mark may indicate that the file is currently checked out of the database by someone else. A yellow triangle may indicate that the file has been copied to test, but not to staging. A light green circle may indicate that the file has been copied to staging. A dark green circle may indicate that the file is on the live servers. According to one embodiment of the invention, the tool determines the status of each file by comparing the file size and date of the last modification on each of the servers in the publishing system. It will be understood that other methods can be used to determine the status of each file. For example, the status of each file can be stored in a database and updated every time the file is copied or selected. It will be understood that the different levels of publishing status can be represented by various color combinations and/or various shapes and the invention is not limited to the color schemes and shapes described above.

As illustrated in FIG. 3, the plus and minus buttons can be used to expand and collapse the branches of the tree illustrated in window section 302. The check boxes can be used to select which projects and/or files the user wishes to test or publish or work on. The user can click on the file name to display the user's publishing rights for that file and to access the publishing history for that file using the history button 314. The currently selected file is displayed with a different background color, and the file name also appears in the right hand panel next to the history button 314. As illustrated in FIG. 3, the "ntserver" file name has been selected in window section 302 and file name appears next to the history button 314 in window section 304.

Figure 7:
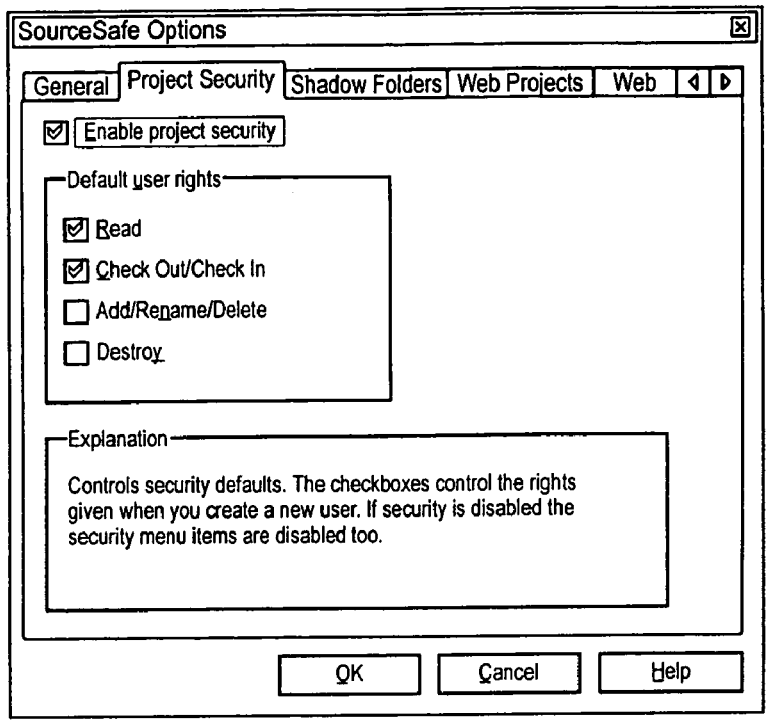
FIG. 7 illustrates a source save options window according to embodiments of the present invention.

Various buttons and information are displayed in window section 304. A user name field 306 illustrates the network account name of the current user. An account with this name must be set up by the VSS administrator in order for the user to access the database and publish files. Each account may have different levels of publishing rights. For example, the database administrator may wish to restrict publishing rights to specific people in order to create different levels of project security. A project security window in SafeSource options can be opened to configure specific user rights as illustrated in FIG. 7. For example, the VSS administrator can explicitly specify different rights such as, for example, read, check out/check in, add/rename/delete, and destroy. The read designation is used to allow the user to read files, but the user cannot change the files. Users with this level of project security will not be able to publish files using the publishing tool. The check out/check in status is used to allow the user to checkout files, edit them and check them back in, but the user cannot add new files, rename files or delete files. In addition, the user will not be able to publish files using the publishing tool. The add/rename/delete status is used to allow the user to perform all basic VSS function operations including deleting files, but the user will not be able to permanently destroy a file when deleting files. The user will be able to publish files to the test server, but will not be able to publish files to the staging server. The destroy status is used to allow the user all possible publishing options. The user will be able to publish files to both the test server and the staging server.

Returning to FIG. 3, a project field 308 displays the name of the currently displayed VSS project. The publishing rights field 310 indicates the publishing rights as determined by the user name and the project field. The file field 312 displays the name of the currently selected file unless a project is selected in which case the file field is left blank.

Figure 4:
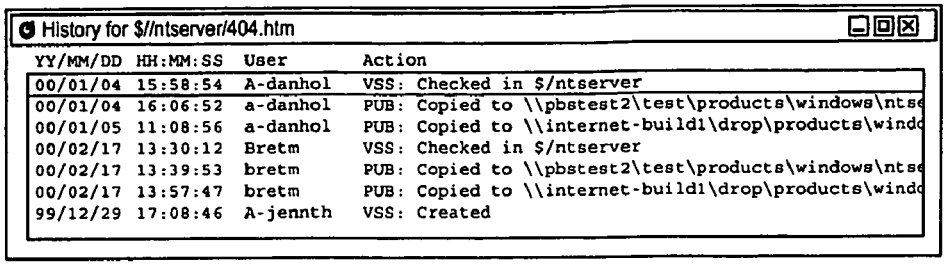
FIG. 4 illustrates a history window according to embodiments of the present invention.

The history button 314 is enabled when a file is selected and disabled when a project is selected. When a user clicks on the history button 314, a display of the VSS check in history and publishing history for the selected file are displayed as illustrated in FIG. 4. The history dialog displays a series of action performed on the file including the date and time that the action occurred and who performed the action. VSS related actions are prefixed by "VSS" and publishing related actions are prefixed by "PUB". More than one history dialog can be opened at one time. For example, if the user clicks the history button and returns to the main window, and then selects another file and clicks on the history button again, two history windows will be opened.

The prop to test button 316 sends any file with check marks in window section 302 to the test server. In addition, a log can be created listing all the files that are sent to the test server. Optionally, the log can also indicate when and by whom the files were sent for testing. When the prop to test button 316 is selected, a notification can be sent via email or otherwise to the test team in order to notify the test team that files have been sent to the test server for testing. In addition, files can be added to the bug-tracking server.

Figure 5:
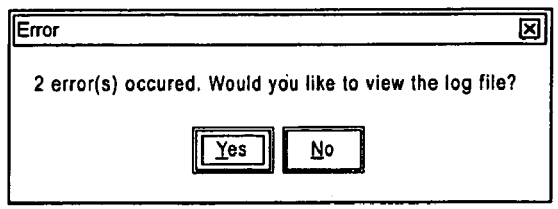
FIG. 5 illustrates an error window according to embodiments of the present invention.
Figure 6:
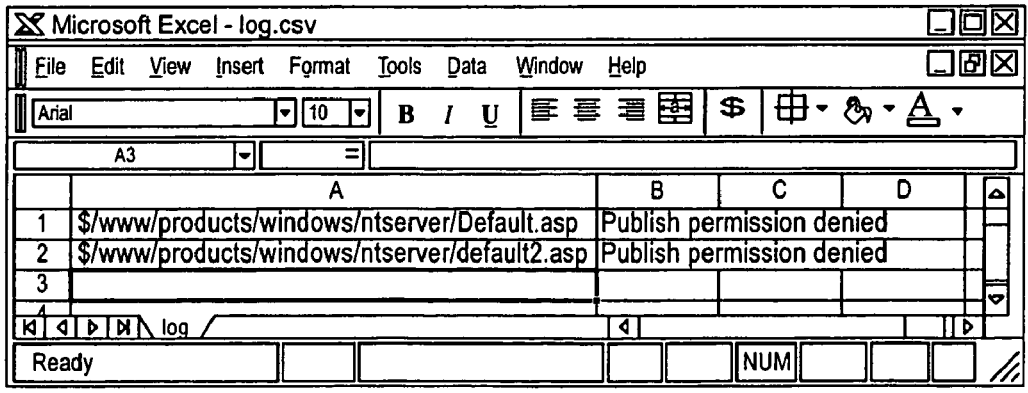
FIG. 6 illustrates an error log screen according to embodiments of the present invention.

If an error occurs during the prop to testing, an error window is displayed when the prop is complete as illustrated in FIG. 5. The error window may indicates how many errors have occurred and prompts the user whether the user would like to view the error log for a description of what errors have occurred. If the user selects "yes," the error log will appear in, for example, a Microsoft Excel window. For each file affected, the error log displays the path of the file in the VSS database along with the error that occurred in the file. A number of different error messages can appear in the error log, for example, "prop to test permission denied", "prop to staging permission denied", "error copying to path", "error creating folder path", and "error updating file history". It will be understood, that additional error messages could also be displayed. The "prop to test permission denied" message indicates that the user tried to prop a file in a project to the test server where the user does not have sufficient rights to do so. The "prop to staging permission denied" message indicates that the user tried to prop a file to the staging server in a project where the user does not have sufficient publishing rights to do so. The "error copying to path" message indicates that a network or other file I/O error occurred during the attempt to copy the file. This can occur if the user has publishing rights, but does not have write-access to either the test server or the staging server. The "error creating folder path" message indicates that the network or other file I/O error occurred during the attempt to create a new file. This can occur if the user has publishing rights, but does not have write access to either the test server or the staging server. The "error updating file history" message indicates a network or other file I/O error occurred during an attempt to update the publishing information history for the file. This can occur if the user does not have write access to the location where the history information is stored.

When the prop to staging button, 318, is selected, any files that have check marks in the window section 302 are copied to the staging server if the user has the appropriate level of publishing rights for that file. If the user does not have rights to prop to staging, an error will begin in the error log and in the history for the file. The prop to staging button 318 only props files of a certain status indicated by their color. For example, the prop to staging button 318 only props files that are red or yellow. Red files are first copied to the test server just as if the user had selected the prop to test button. The files are then copied to the staging server and the file name or icon color is changed to green.

The cancel button 320 can be used to cancel a long running prop during the prop. The cancel button 320 may only stop the project in between files, it will not stop the process in the middle of copying a file.

The show log button 322 is used to display the user's local prop log file. This file is updated whenever a file is propped or an error occurs during the prop process. This file displays the same error information as described above, but includes the date and time that the error occurred. It also includes information about files that were propped successfully. This file is not erased each time the user requests a prop, and new log information is appended to the file each time an error occurs.

The refresh button 324 is used to refresh the user's display of the VSS database. The user may wish to do this if the user knows that one or more files have been added, renamed, or deleted by someone else since the user started the tool and the user wishes to see the changes reflected in the tree view of window 300. When the user clicks the refresh button, the VSS tree view retains any check marks the user may have specified and retains the expanded/collapsed state of all projects.

The info button 326 is used to display a message box displaying the current configuration information for the propagation tool. This shows the network locations of the VSS database, the shadow, the test server, staging server, etc. The information can only be changed by the propagation tool administrator and is only included for informational purposes.

Figure 8:
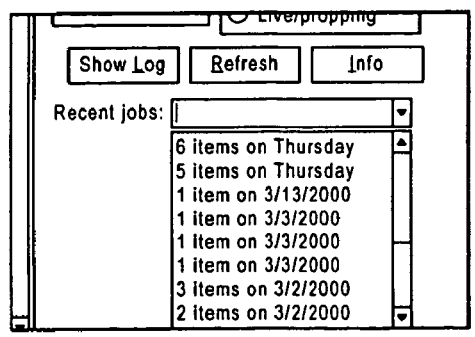
FIG. 8 illustrates a drop-down list of recent jobs according to embodiments of the present invention.

The recent jobs field 328 allows the user to view a predetermined number of the most recent jobs performed by the user's computer. For example, if the arrow button 329 is selected by the user, a drop-down window with a list of the most recent jobs appears as illustrated in FIG. 8. In FIG. 8, the list of recent jobs are identified by the number of items and a date, but the invention is not limited thereto.

Figure 9:
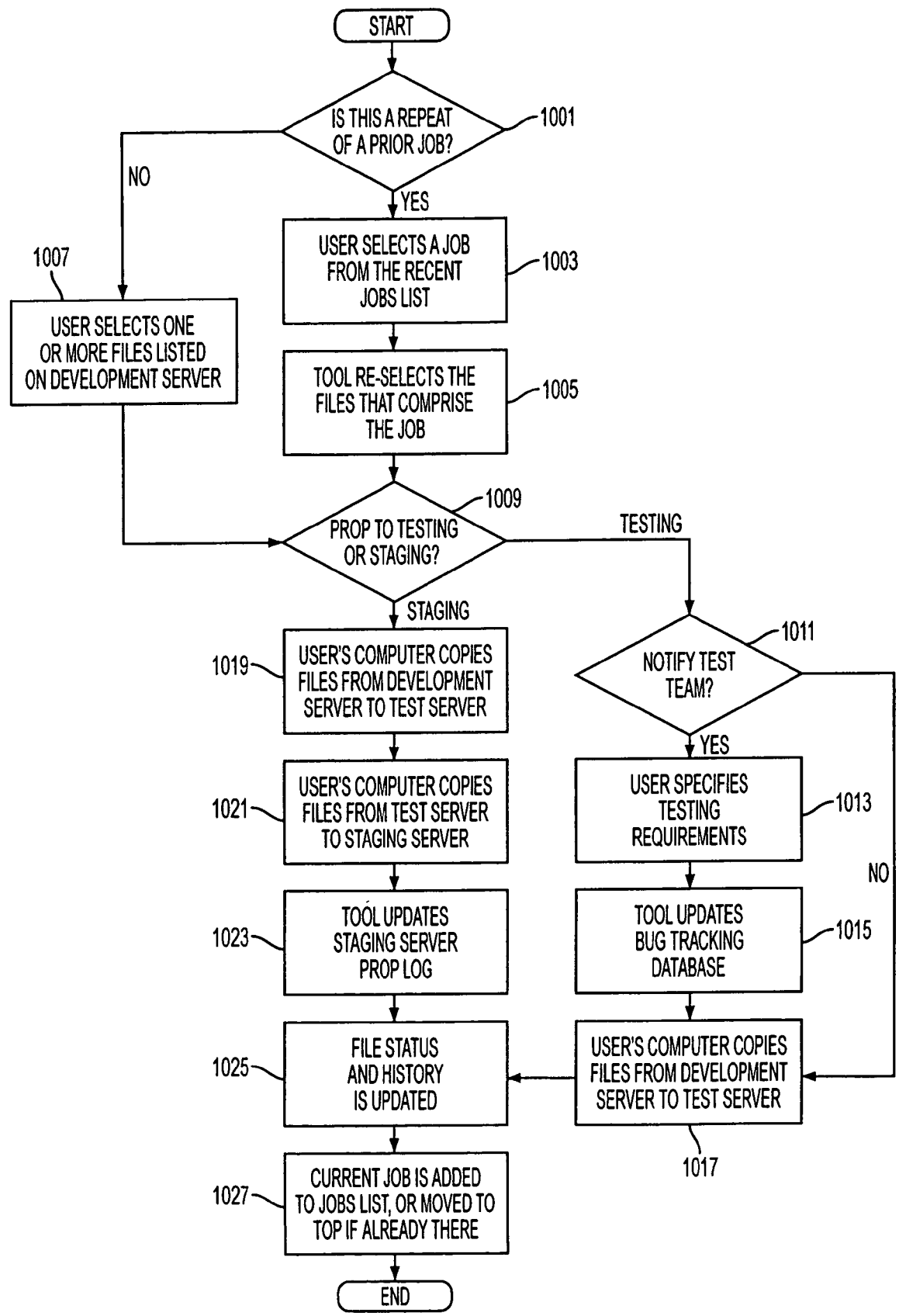
FIG. 9 is a flowchart illustrating the operation of the propagation tool with reference to the system architecture illustrated in FIG. 2 according to embodiments of the present invention.

The operation of the file propagation tool in the publishing system illustrated in FIG. 9. First, if it is determined that the user wants to repeat a prior job in step 1001, the user can select a job from the recent jobs list in step 1003. The tool then reselects the files that comprise the selected job in step 1005. If the user does not want to select a prior job, the user selects at least one file listed on the development server in step 1007. The tool creates a "job" which is simply a list of the selected files and folders. As previously described, the tool keeps a list of the most recent jobs to allow the user to easily re-select the same set of files and folders at a later time.

If the user decides to send the selected files to the test server 206 in step 1009, the tool prompts the user whether the test team should be notified of the test in step 1011. If the user wants to notify the test team, the tool prompts the user to create a message indicating the tests to be performed on the selected group of files in step 1013. For example, a screen can be displayed with some pre-defined tests that can be selected with check boxes and a message field for providing more detailed information about test or other information. For example, the user can choose to indicate the priority level of the test. An indication is then sent to the test team to notify them that files have been copied to the test server for testing. For example, if the system has a bug-tracking server, such as Microsoft RAID server, the tool adds an item to the RAID database and assigns the item to the test team in step 1015. The RAID item includes testing information the user provided along with a list of files the user copied to test. Each person on the team has a RAID Notifier tool installed. This tool checks the RAID database once per minute to look for new items, so when files are copied to the test server for testing, the test team is notified within one minute. After the tests are completed, the test team assigns the RAID item back to the user who copied the files. The RAID Notifier then notifies the original user that the testing is complete. It will be understood that other forms of notification, for example, e-mail, can be used to notify the test team. Alternatively, the test team may not be notified at all. The selected group of files is then copied from the development server 204 to the user's computer 202 and then from the user's computer 202 to the test server 206 in step 1017. Alternatively, the files may be copied from the development server to the test server. The status of the files is then updated to indicate that the files are being tested and an entry in the test server log file is made which indicates, for example, the files to be tested, the test selected, date, who requested the test, etc., in step 1025.

Once the specified tests have been performed, it is then determined whether the tests were successfully completed. If the tests were unsuccessful, a message is sent to the user's computer 202 indicating that the tests were unsuccessful and optionally the reasons why the tests were unsuccessful. If the testing was successful, a message indicating that the tests were successfully completed is sent to the user's computer.

If the user determines that the files should be propped to the staging server in step 1009, the tool copies the files from the development server to the test server 206 in step 1019. The user's computer then copies the files from the test server 206 to the staging server 212 in step 1021. The user can select the previous "job" that the tool stored so that the user doesn't have to manually re-select the same set of files. By using the job features, the user also ensures that the exact same set of files is selected so files are not accidentally added or omitted. Alternatively, the selected group of files may be copied directly from the test server 206 to the staging server 212. Also, the files can be copied from the development server to the staging server 212. The status of the selected files is then updated to indicate that they are on the staging server and an entry is made in the staging server's log file indicating, for example, which files have been copied to the staging server, the date, the user who copied the files to the staging server in step 1023. The files can then be copied to a live server(s). Alternatively, a separate tool, such as Microsoft's PubWiz tool can be used to copy files from the staging server to the live server(s). For example, a person on the team for running the PubWiz tool may periodically check the staging server log file to see if any files have been sent to the staging server. The PubWiz tool can then be used to copy these files to the live server(s) and then clean out the log file.

Figure 10:
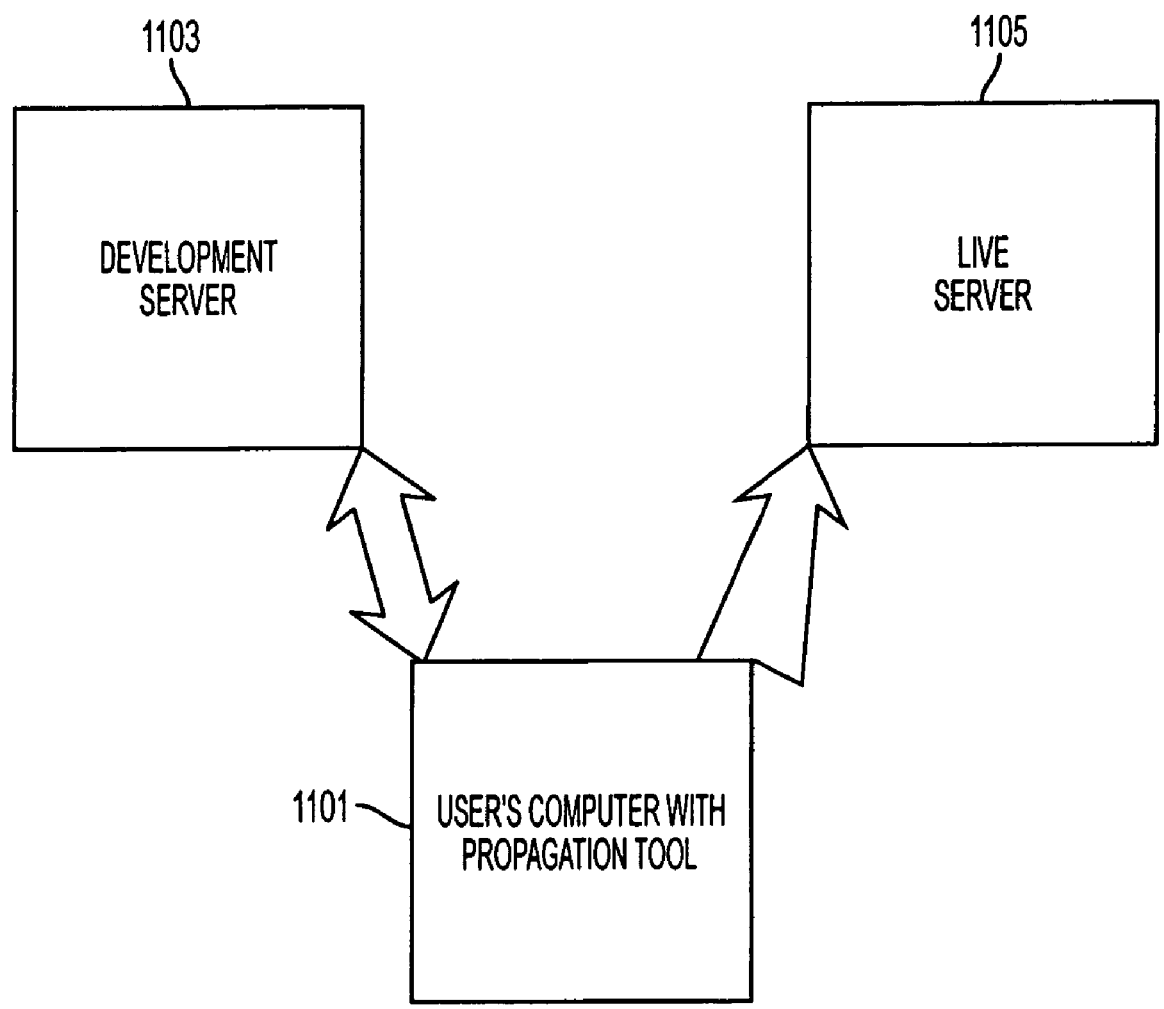
FIGS. 10 and 11 illustrate alternative publishing system application architectures according to embodiments of the present invention.
Figure 11:
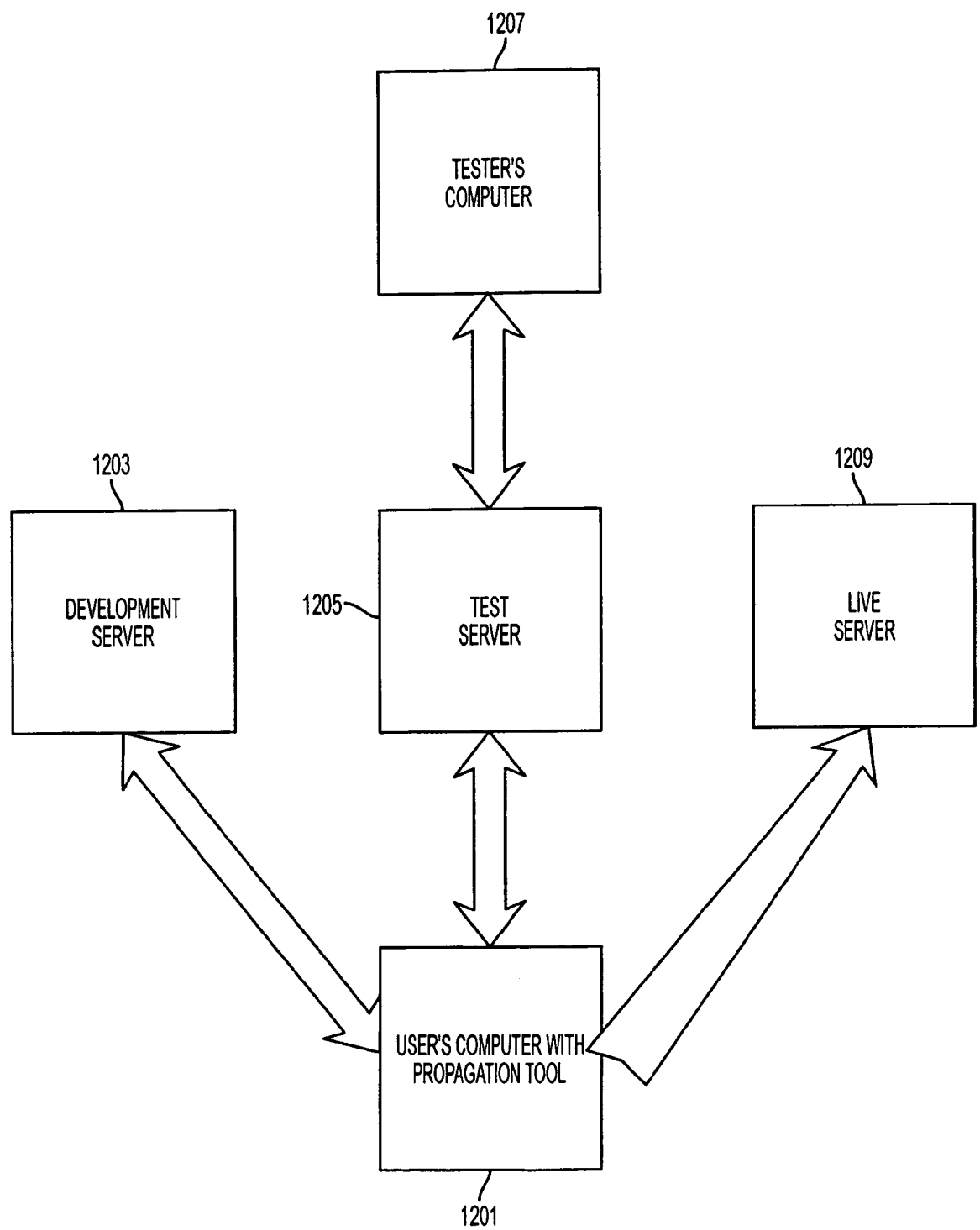

As stated above, other publishing system application architectures can be used with the propagation tool. A simple architecture might comprise a user's computer 1101, a development server 1103, a live server 1105 as illustrated in FIG. 10. The propagation tool could then be used to select the modified files from the development server 1103 to be copied to the user's computer 1101 and then copied to the live server 1105. Alternatively, the selected files may be sent directly from the development server 1103 to the live server 1105. Another possible architecture is illustrated in FIG. 11, in which the architecture comprises a development server 1203, a test server 1205, a live server 1209, a computer 1201 loaded with the propagation tool and a tester's computer 1207. It will be understood that the architectures illustrated in FIGS. 2, 10 and 11 are illustrative and the present invention is not limited to these architectures.

Although the present invention has been described in connection with the preferred embodiments of the invention, it will be understood by those of ordinary skill in the art that many modifications can be made thereto within the scope of the claims which follow. Accordingly, it is not intended that the scope of the invention in any way be limited by the above description, but that it be determined by reference to the claims that follow.

What is claimed is:

1. One or more computer readable media storing computer executable instructions for performing a method for controlling a flow of files from a development server to another server using a file propagation tool, said method comprising the steps of:
   creating a job, comprising at least one file in a development server, wherein said at least one file is selected using said file propagation tool loaded on a computer;
   copying said job to said computer;
   sending the job to a testing server for testing;
   generating and sending a message to the testing server indicating a type of test to be performed on the job;
   copying said job to a live server;
   displaying a screen of said file propagation tool on said computer, wherein said screen displays a list of files stored on the development server, wherein each file name is displayed in one of a plurality of colors, and wherein each color represents different file status; and
   updating the user interface to indicate that the plurality of files are undergoing testing.

2. The computer readable media according to claim 1, wherein in the displaying step, different colored shapes are displayed next to file names, wherein said different colored shapes represent different file status.

3. The computer readable media according to claim 2, wherein in the displaying step a legend is displayed on said screen depicting the meaning of each colored shape.

4. One or more computer readable media storing computer executable instructions for performing a method for controlling a flow of files, comprising step of:
   receiving on a user computer a job that references at least a plurality of files;

propagating the job by sending the job from a development computer to a testing server for testing;

generating and sending a message to the testing server indicating a type of test to be performed on the job;

displaying a user interface that indicates a current publishing status of each of the plurality of files as the job propagates to a testing server and a live server; and updating the user interface to indicate that the plurality of files are undergoing testing.

5. The computer readable media of claim 4, wherein in the displaying step the current publishing status of one of the plurality of files includes a status of being edited.

6. The computer readable media of claim 5, wherein the current publishing status of another of the plurality of files includes a status of undergoing testing.

7. The computer readable media of claim 5, wherein the current publishing status of another of the plurality of files includes a status of being on the live server.

8. The computer readable media of claim 4, wherein the user computer comprises the development computer.

9. The computer readable media of claim 4, wherein each publishing status is displayed in one of a plurality of colors.

* * * * *